(12) United States Patent
Nadkarni et al.

(10) Patent No.: US 11,122,452 B2
(45) Date of Patent: Sep. 14, 2021

(54) SYSTEM AND METHOD FOR LOAD BALANCING OF NETWORK PACKETS RECEIVED FROM A MME WITH SMART FILTERING

(71) Applicant: NetScout Systems, Inc, Westford, MA (US)

(72) Inventors: Rajeev Nadkarni, Chelmsford, MA (US); Abhishek Saraswati, Santa Clara, CA (US); Anil K. Singhal, Carlisle, MA (US); Bruce A. Kelley, Jr., Westford, MA (US); Narendra Byrapuram, Westford, MA (US); John Peter Curtin, Richardson, TX (US); Tauras Liubinskas, Lexington, KY (US)

(73) Assignee: NetScout Systems, Inc, Westford, MA (US)

( * ) Notice: Subject to any disclaimer, the term of this patent is extended or adjusted under 35 U.S.C. 154(b) by 0 days.

(21) Appl. No.: 16/849,470

(22) Filed: Apr. 15, 2020

(65) Prior Publication Data
US 2020/0329391 A1 Oct. 15, 2020

Related U.S. Application Data

(60) Provisional application No. 62/833,949, filed on Apr. 15, 2019.

(51) Int. Cl.
*G06F 9/455* (2018.01)
*H04L 12/26* (2006.01)
(Continued)

(52) U.S. Cl.
CPC ........ *H04W 24/08* (2013.01); *G06F 9/45558* (2013.01); *H04L 43/028* (2013.01);
(Continued)

(58) Field of Classification Search
CPC ....... G06F 9/45558; G06F 2009/45595; H04L 43/028; H04L 43/04; H04L 43/06;
(Continued)

(56) References Cited

U.S. PATENT DOCUMENTS

| 2014/0259012 A1* | 9/2014 | Nandlall | H04L 67/1097 718/1 |
| 2016/0147548 A1* | 5/2016 | Itsumi | H04L 67/101 718/1 |

(Continued)

FOREIGN PATENT DOCUMENTS

WO WO-2016022698 A1 * 2/2016 ............. H04L 43/16

*Primary Examiner* — Kostas J Katsikis
(74) *Attorney, Agent, or Firm* — Locke Lord LLP; Scott D. Wofsy; Christopher J. Capelli (57) ABSTRACT

A system and method for monitoring one or more Mobility Management Entities (MMEs) with a plurality of scalable network probe devices arranged in a cluster format. A ciphered packet is received from one or more MMEs at a packet switching device. The packet switching device in turn sends all the ciphered packets to each of the plurality of clustered probes. Each of the network probes then in turn deciphers the packets received from the MME and extracts metadata from the deciphered packet to identify subscriber session information contained in the received packet. Each of the network probes then selectively retains deciphered packet information relating to a subscriber session and/or other prescribed criteria designated for that particular network probe and discards the remaining deciphered packet or portions of the packet so as to balance the load amongst the plurality of probes based upon prescribed load balancing criteria. KPI and other session related data is generated in a network probe associated with a subscriber session from the retained deciphered packet information. Subscriber session related data from each clustered network probe is then aggregated with at least one monitoring device operably (Continued)

coupled to the clustered probes such that a user of the monitoring device is provided with the perception that the monitoring device is coupled to a single probe.

20 Claims, 3 Drawing Sheets

(51) Int. Cl.
*H04W 12/037* (2021.01)
*H04W 24/08* (2009.01)

(52) U.S. Cl.
CPC ............ *H04L 43/04* (2013.01); *H04L 43/065* (2013.01); *H04L 43/12* (2013.01); *H04W 12/037* (2021.01); *G06F 2009/45595* (2013.01)

(58) Field of Classification Search
CPC .... H04L 43/065; H04L 43/12; H04W 12/037; H04W 24/08
See application file for complete search history.

(56) References Cited

U.S. PATENT DOCUMENTS

| | | | |
|---|---|---|---|
| 2016/0255013 A1* | 9/2016 | Cox | H04L 47/762 |
| | | | 709/226 |
| 2017/0195431 A1* | 7/2017 | Tamura | H04W 76/20 |
| 2018/0069749 A1* | 3/2018 | Singhal | G06F 9/45558 |
| 2019/0272002 A1* | 9/2019 | Seenappa | G06F 9/45558 |
| 2019/0342187 A1* | 11/2019 | Zavesky | H04L 41/5009 |
| 2020/0257550 A1* | 8/2020 | Qin | G06F 9/5027 |
| 2020/0328960 A1* | 10/2020 | Nadkarni | H04L 43/062 |
| 2020/0329391 A1* | 10/2020 | Nadkarni | H04L 43/12 |

* cited by examiner

SYSTEM AND METHOD FOR LOAD BALANCING OF NETWORK PACKETS RECEIVED FROM A MME WITH SMART FILTERING

CROSS REFERENCE TO RELATED APPLICATIONS

This application claims priority to U.S. Patent Application Ser. No. 62/833,949 filed Apr. 15, 2019 which is incorporated herein by reference in its entirety.

FIELD OF THE INVENTION

The disclosed embodiments generally relate to monitoring data packets transmitted over a network, and more specifically to load balancing of packets between multiple network probes using smart filtering techniques.

BACKGROUND OF THE INVENTION

To optimize the performance and operation of modern computer networks, network operators routinely use network probes to monitor network traffic as well as measure end-user experience by calculating performance and quality parameters in real-time. These parameters include, but are not limited to, bit rate, jitter, packet drop rate or bit error rate, and packet latency.

However, the enormous, and increasing, amounts of data transmitted over wired and wireless networks at high data transfer speeds, particularly with the introduction of the 10 gigabit ("10 GbE") networking standard, present a challenge to real-time monitoring of network performance.

Network performance monitoring is further complicated by telecommunications routers and gateways using new architectures, some of which are designed to support the 10 GbE networking standard for mobile networks. These architectures are also used, in part, to enable network service providers to prioritize certain types of network traffic.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, the illustrated embodiments relate to a system and method for monitoring one or more Mobility Management Entities (MMEs) with a plurality of scalable network probe devices arranged in a cluster format. A ciphered packet is received from one or more MMEs at a packet switching device. The packet switching device in turn sends all the ciphered packets to each of the plurality of clustered probes. Each of the network probes then in turn deciphers the packets received from the MME and extracts metadata from the deciphered packet to identify subscriber session information contained in the received packet. Each of the network probes then retains deciphered packet information relating to a subscriber session and/or other prescribed criteria designated for that particular network probe and discards the remaining deciphered packet or portions of the packet so as to balance the load amongst the plurality of probes based upon prescribed load balancing criteria. KPI and other session related data is generated in a network probe associated with a subscriber session from the retained deciphered packet information. Subscriber session related data from each clustered network probe is then aggregated with at least one monitoring device operably coupled to the clustered probes such that a user of the monitoring device is provided with the perception that the monitoring device is coupled to a single probe.

Exemplary advantages provided by the illustrated embodiments includes monitoring high-capacity MMEs by using smart filter software logic integrated with individual network probes whereby packets are sent from high-capacity MMEs to each of a plurality of clustered network probes. Each network clustered probe is provided with smart-filtering software logic executed by each of the clustered network probes using minimal/efficient use of computer resources provided by the network probes. The smart filter software logic integrated with each individual network probe is configured to tag each received packet with filterable keys, such as IMSI, IMEI, Cell-Id, etc., which tags are preferably utilized for providing the filter logic. Monitoring devices (such as an nGeniusOne (nG1) and a sessions analyzer (nSA), commercially available from NetScout Technologies Inc.) aggregate data from the probe cluster for presentation to a user of a monitor device as if the data originated from a single probe.

BRIEF DESCRIPTION OF THE DRAWINGS

The accompanying appendices a d/or drawings illustrate various non limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Figure 1:
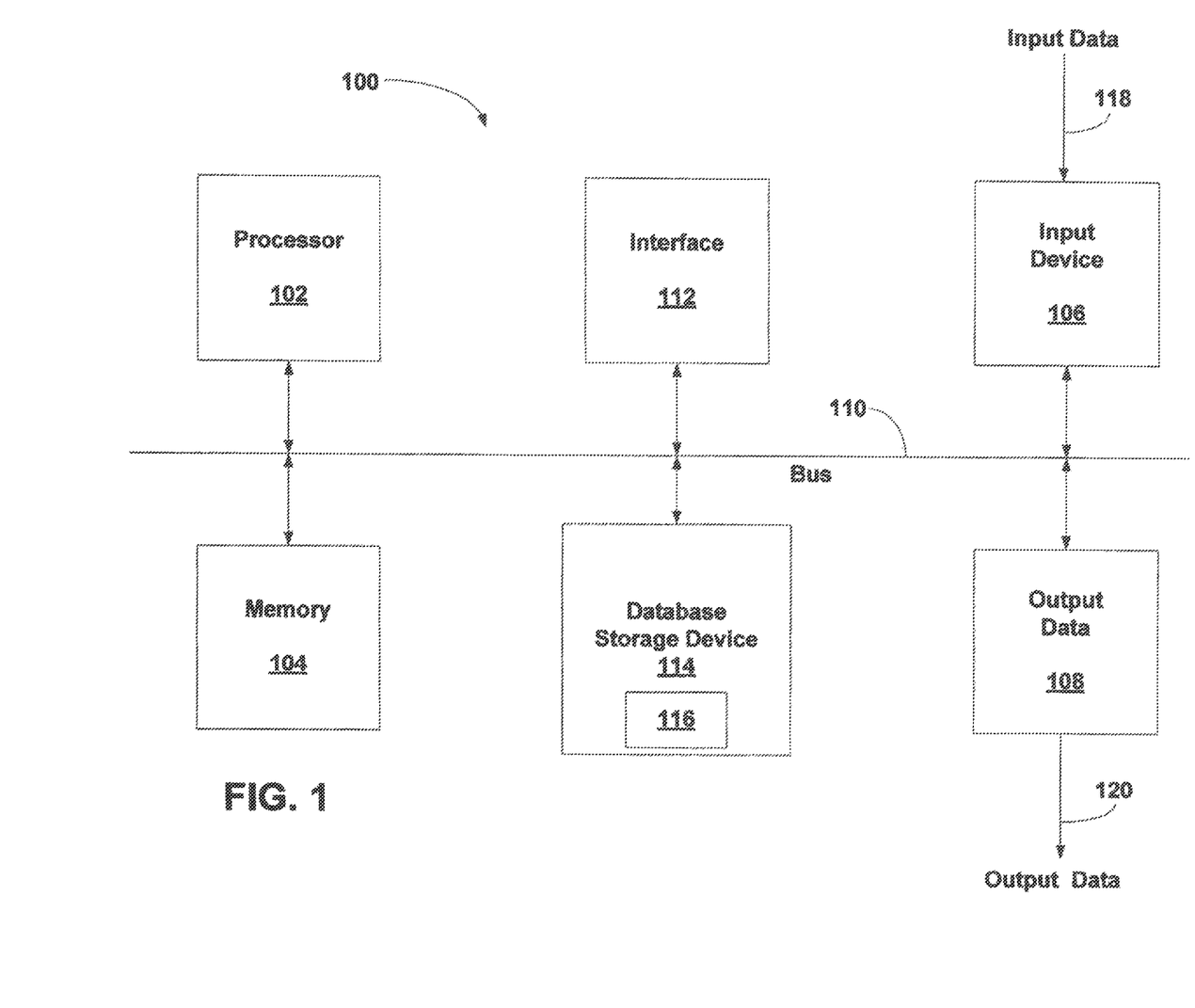
FIG. 1 depicts an exemplary computing system in which certain components of the below illustrated embodiment of FIG. 2 may be implemented.

Turning now descriptively to the drawings, in which similar reference characters denote similar elements throughout the several views, FIG. 1 depicts an exemplary computing system in which below illustrated embodiments may be implemented.

A generalized computering embodiment in which the illustrated embodiments can be realized is depicted in FIG. 1 illustrating a processing system 100 which generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a tablet device, smart phone device, a server, a router, a network PC, a peer device, or other common network node, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which certain components of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

It is to be further appreciated, embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices. Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, reference is now made to FIG. 2 which illustrates an embodiment of a network transmission system 200 capable of transmitting packets from a Mixed Mobility Enitity (MME) 202 to a cluster of network probes 210. The example network transmission system 200 is also configured to balance the network monitoring load between several network probes 214, 216 at or near the data transmission rate ("line rate" or "approximate line rate"—1.5M pps) of the network transmission system 200. In the illustrative embodiments, it is to be understood the MME 202, may consist of (but is not to be understood to be limited to) the following types of network interfaces: S1-MME, S3, S10 and S6a feed interfaces. The MME 202 may be either hardware and/or software based.

Figure 2:
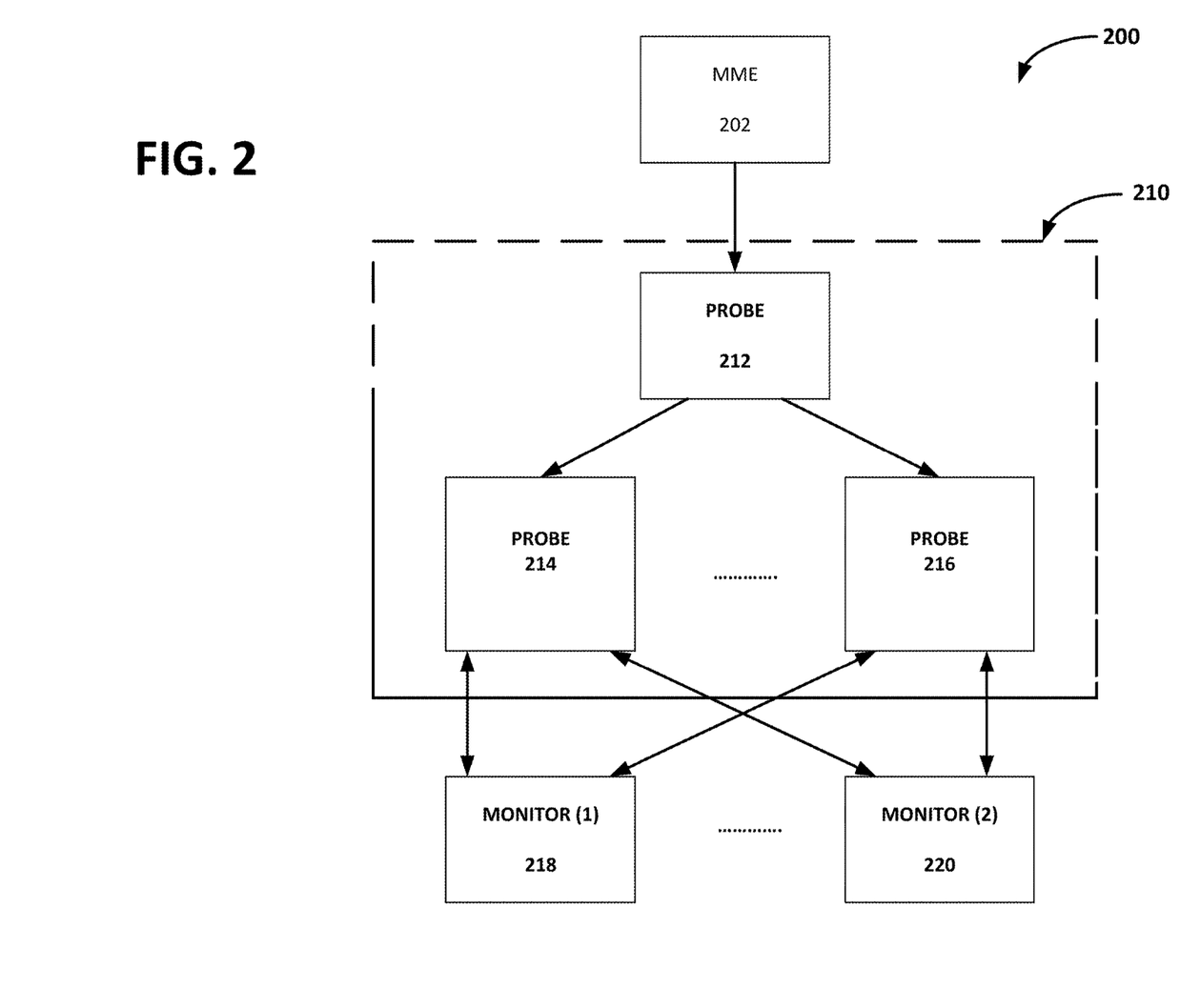
FIG. 2 depicts an illustrative embodiment of a network transmission system in accordance with the illustrated embodiments.

In certain illustrative embodiments, it is to be appreciated a ciphered packet received at a probe 214, 216 contained in the cluster of network probes 210 (as described below) from the MME 202, via a packet switching device 212 (as also described further below), may be a synthetic packet containing messages and filter terms for a plurality of subscribers. Each probe 214, 216 in the network probe cluster 210 preferably includes smart filter software logic configured and operational to decipher the ciphered packet received from the packet switching device 212, and generate multiple synthetic packets from a received synthetic packet such that each generated packet is associated with an individual subscriber session. Each probe 214, 216 in the cluster of network probes 210 is operational to retain packet information associated with a certain subscriber session and discard the remaining synthetic packets associated with other subscriber sessions. As discussed further below, a monitor device 218, 220 preferably communicates with each probe 214, 216 contained in the cluster of network probes 210 to provide instructions to the smart filter software logic associated with each probe 214, 216, which instructions prescribe which probe 214, 216 is to be assigned to which subscriber session so as to retain packet information relating to that assigned subscriber session and discard other packet information relating to other subscriber sessions to achieve load balancing amongst the cluster of network probes 210.

Each probe 214, 216 in the cluster of network probes 210, preferably via its smart filter software logic, is configured and operational to extract metadata from packets received from the packet switching device 212, which metadata may include filter terms such IMSI, IMEI-SV and Cell-Id information (which may be utilized to generate the ASI data) for example. It is to be appreciated these filters terms generated by each probe 214, 216 in the cluster of network probes 210 preferably results from efficient state machine processing. This extracted metadata also preferably consists of session information to be utilized by the probes 214, 216 in the cluster of network probes 210 for performing parallel processing of packet sessions across multiple subscriber session threads—so as to optimize VM computer processing resources associated with the cluster of network probes 210. Also, the deciphering of packets in each probe 214, 216 of the cluster of network probes 210 preferably determines Temporary Identifiers (M-TMSI) assigned to an individual subscriber. Additionally, the probes 214, 216 in the cluster of network probes 210 are further to be understood to be configured and operational to process handovers between eNodeBs such that deciphered packet information relating to an individual subscriber session assigned to that probe 214, 216 is retained while the other non-assigned subscriber session portions are discarded, preferably via its smart filter software logic.

As shown in the illustrated embodiment of FIG. 2, the cluster of network probes 210 are coupled to a packet switching device 212 configured to distribute packets received from the MME 202 to each one of the probes 214, 216 contained in the cluster of network probes 210. Examples of the packet switching device 212 include network routers and filters capable of monitoring and directing data packets, such as the NGENIUS 1500 produced by NetScout Systems, Inc. of Westford, Mass. The packet flow switching device 212 distributes packets received from the MME 202 preferably to each of the probes 214, 216 contained in the cluster of network probes 210 connected to packet switching device 212. It is to be appreciated the packet flow switching device 212 can also distribute the packets to other systems, including, but not limited to, security, and financial transaction systems (such as billing), and other systems using the packets for any of a variety of purposes.

One or more monitor devices 218, 220 are each preferably coupled to the network probes 214, 216 for performing various analytic functionalities relating to subscriber packets received from the MME 202, as discussed further below. Transmission links preferably convey subscriber packets from the MME to the cluster of network probes 210 through any of a variety of networks, including the Internet (e.g., networks using TCP/IP protocol transmission), wireless communication networks (e.g., 3G, 4G LTE protocol networks), networks internal to an organization or entity (e.g, WLAN, LAN), and combinations thereof.

In accordance with the illustrative embodiment of FIG. 2, the probes (e.g., 214, 216) in the cluster of network probes 210 are to be understood to be hardware, software, firmware, or combinations thereof, for monitoring data transmission through a plurality of transmission links. While generally the network probes 210 may be deployed at any of a variety of locations or links of a network to collect network data packets transmitted, in this case the network probes 210 are connected to a network through the packet switching device 212 which, as described herein, receives packets having subscriber session information from a MME 202. It is to be understood, the network probes 210 may be a special purpose computing device or a software component (not limited to a single process) dedicated to monitoring data communicated via a network. Alternatively, the network probes 210 may be a computing device with specialized software components installed thereon. In one embodiment, the network probes 210 are a NGENIUS COLLECTOR, NGENIUS PROBE or NGENIUS INFINISTREAM ("ISNG device"), available from NetScout Systems, Inc. of Westford, Mass.

For ease of illustration, only two probes 214, 216 are shown coupled to the smart cluster probe 212, however, it is to be understood any number of probes may be coupled to the packet switching device 212 in accordance with the teachings herein. It is to be appreciated each ISNG device provided in the cluster of probes 210 is configured and operational to generate Adaptive Service Intelligence (ASI) data relating to a subscriber packet session subject to analysis of an ISNG device. ASI data is to be understood to include key performance indicators and adaptive session records ("ASRs") as described in U.S. patent application Ser. No. 12/756,638 entitled "Real-Time Adaptive Processing of Network Data Packets for Analysis" and filed on Apr. 8, 2010. The methods and systems described in U.S. patent application Ser. No. 12/756,638 to enable the network probes 210 to analyze network performance and end user experience in real-time, without extensive network buffering and analysis. This application also incorporates by reference in its entirety U.S. Pat. No. 9,923,808.

Additionally, in the illustrative example of FIG. 2, each probe 214, 216 in the cluster of network probes 210 may be configured as a Virtual Machine (VM), however, and as stated above, each probe 214, 216 may consist of hardware, software, firmware, or combinations thereof, for monitoring data transmission through the plurality of transmission links. While generally the cluster of network probes 210 may be deployed at any of a variety of locations or links of a network to collect network data packets transmitted through certain links, in this case the network probes 214, 216 are connected to the network through the packet switching device 212. As discussed herein, each probe 214, 216 in the cluster of network probes 210 is preferably provided with smart filter software logic that provides balancing of subscriber packets received from the MME 202 between the multiple network probes 214, 216. In accordance with an illustrated embodiment, a monitoring device 218, 220 prescribes the instructions to the smart filter software logic of each of the multiple of network probes 214, 216 for enabling and conducting load balancing of packets received from the MME 202 amongst the cluster of network probes 210 (as described herein).

It is to be understood the network transmission system 200 is shown in FIG. 2 to include a single cluster of network probes 210 coupled to a single MME 202 for ease of illustration purposes only as the it is to be understood the network transmission system may consists of multiple clusters of network probes 210 coupled to multiple MMEs 202 in accordance with the teachings of the illustrative embodiments. Additionally, each cluster of network probes 210 may be coupled to any multiple of monitoring devices, and is not to be understood to be limited to the two monitor devices 218, 220 shown in FIG. 2.

Figure 3:
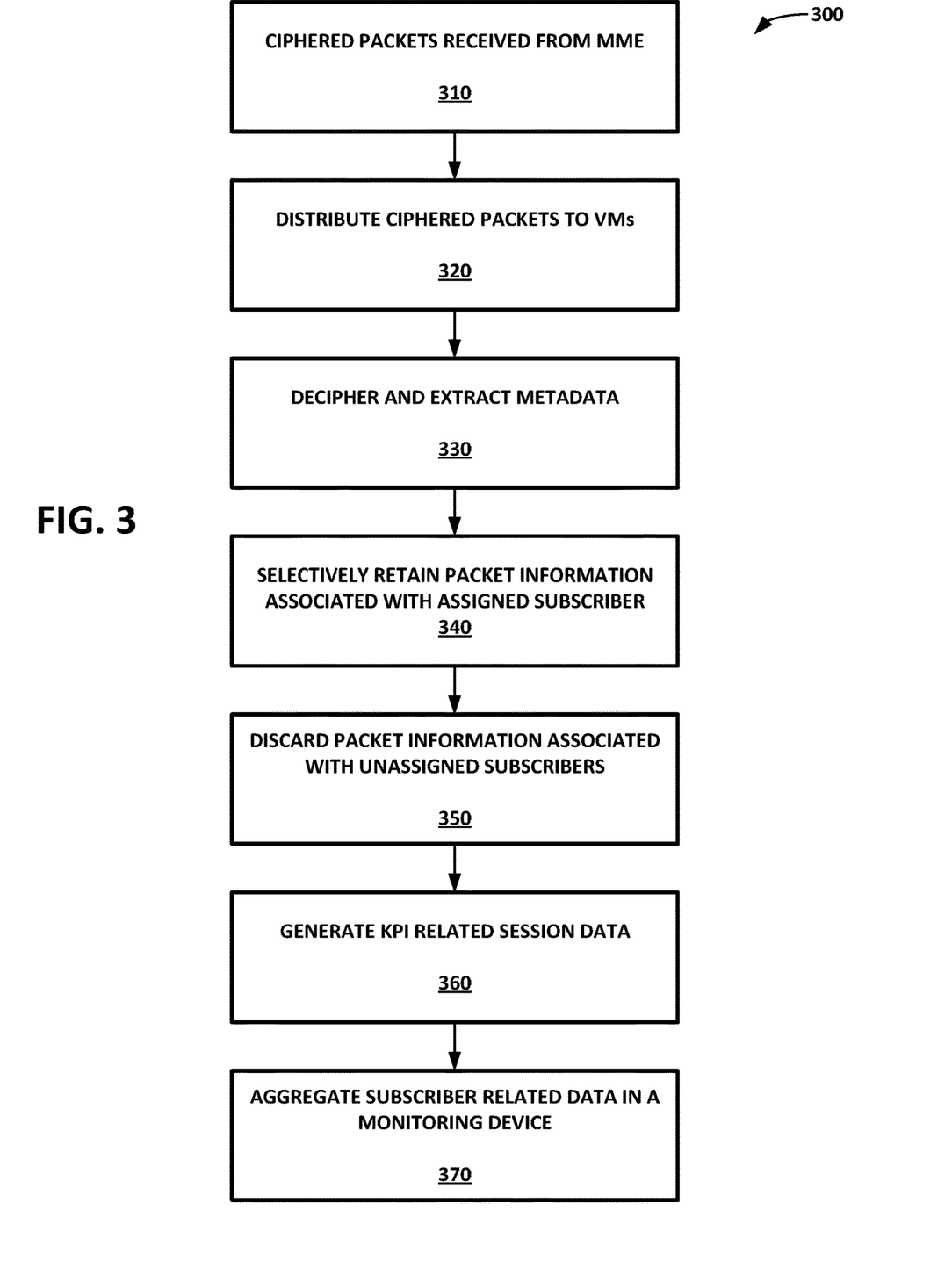
FIG. 3 is a flow chart depicting an exemplary process of operation for the system of FIG. 2 in accordance with the illustrated embodiments.

With certain components of system 200 described above, a description of operation of the network transmission system 200 of FIG. 2 is now provided with reference to process 300 of FIG. 3 (and with continuing reference to system 200 of FIG. 2). It is to be understood network system 200 provides a system and method for monitoring one or more Mobility Management Entities (MMEs) 202 with a plurality of scalable Virtual Machines (VM)("probes") 210 arranged in a cluster format so as to aggregate data from the clustered VMs 214, 216 for distribution to one or more monitoring devices 218, 220. In operation, ciphered packets are received from a MME 202 at the packet switching device 212 (step 310). The ciphered packets are then distributed to preferably all the probes 214, 216 provided in the cluster of network probes 210 (step 320). Each probe 214, 216 provided in the cluster of network probes 210 preferably contains smart filter software logic configured and operational to decipher the ciphered packet received from the MME 202 and extract metadata from the deciphered packet to identify subscriber information contained in the received packet (step 330).

Each probe 214, 216 provided in the cluster of network probes 210 then preferably retains packet information relating to a subscriber session designated for that probe 214, 216 (step 340). Each probe 214, 216 is additionally configured and operational to discard the remaining packet information relating to other subscriber sessions which are not designated for processing by that particular network probe 214, 216 so as to achieve load balancing amongst the cluster of network probes 210 (step 350). It is to be understood the load balancing performed by each probe 214, 216 of the cluster of network probes 210 is preferably based upon prescribed load balancing criteria such that each packet received from the MME 202 for an identified subscriber session is maintained in a same network probe (e.g., probe 214) such that load balancing is performed on a per subscriber session basis and/or with other state-based criteria. The load balancing performed amongst the cluster of network probes 210 by each of the network probes 214, 216 is preferably performed in accordance with a stateful process, and may include deep packet inspection of a packet received from the MME 220 via the packet switching device 212. It is to be further understood the load balancing performed by the network transmission system 210 is scalable such that individual probes 214, 216 may be added or subtracted (e.g., activated, inactivated) from the cluster of probes 210 preferably predicated upon network demand of the MME 202 to provide scalability and efficient cluster based monitoring provided by the network transmission system.

Upon receipt of a packet from the packet switching device 212, a receiving probe (e.g., 214), preferably after discarding the packet information relating to subscriber sessions not designated (assigned) for processing by that particular network probe (e.g., 214) (as discussed above), generates KPI session related data associated with subscriber session information associated with the maintained packet session information designated for processing by that particular network probe (e.g., 214)(step 360). The subscriber related data is then preferably aggregated from each network probe 210 with at least one monitoring device 218 operably coupled to the clustered network probes 210 wherein a user of the monitoring device 218, 220 is provided with the perception that the monitoring device 218, 220 is coupled to a single VM (e.g., VM 214)(step 370). The subscriber related data generated by each probe 214, 216 in the cluster of probes 210 upon processing of the received deciphered packet information is preferably stored in a memory device (e.g., a disk, database, etc.) associated with the probe 214, 216. Additionally, it is to be understood KPI information relating to a subscriber session generated by each probe 214, 216 in the cluster of probes 210 is preferably distributed for storage in a monitoring device 218, 220.

It is to be appreciated that each monitor device 218, 220 is configured to perform on-demand and/or real-time analysis of subscriber packet information received in the cluster of network probes 210. For instance, when performing on-demand analysis, subscriber data is aggregated preferably from each probe 214, 216 of the cluster of network probes 210. The monitor device 218, 220 is preferably configured to aggregate Key Performance Indicator (KPI) data from the clustered probes 210 associated with subscribers. In such an exemplary embodiment, the monitor device may consist of an nGeniusOne device sold by NetScout Systems, Inc. of Westford, Mass.

It is to be appreciated that when performing real-time analysis, a monitor device 218, 220 is configured and operational to perform real-time analysis of subscriber packet information by querying and retrieving subscriber information from the cluster of probes 210 relating to a user analysis request in a certain monitor device 218, 220 so as to retrieve subscriber session data from an individual VM probe (e.g., 216) regarding a subscriber session associated with that user analysis. In such an exemplary embodiment, a monitor device 218, 220 may consist of a packet session analyzer ("nsa") (e.g., Iris Session Analyzer sold by NetScout Systems, Inc. of Westford, Mass.) configured to analyze subscriber calls and sessions, being preferably configured to perform deep packet analysis on the retrieved subscriber data.

It is to be further understood and appreciated that when the aforesaid network transmission system 200 is monitoring one or more Mobility Management Entities (MMEs) 202 with a cluster of network probes 210 as described above, subscriber sessions across X2 and S1 handovers are also monitored and tracked by the system 200. Additionally, the system 200 is further configured and operational to detect session transitions during MME handovers and during inter-RAT handovers. Still further, the system 200 of the illustrative embodiment shown and described in FIGS. 2 and 3 may be further configured and operational to: decipher of packets in the network probes 210 to determine M-TMSI assigned to an individual subscriber; monitor subscriber sessions across idle and active transitions; monitor subscriber session across X2 and S1 handovers; detect session transitions during MME handovers; and detect session transitions during inter-RAT handovers by the illustrative network transmission system 200, which all of the above are also applicable when monitoring a Unified Serving Node (USN).

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof. Additional description of the illustrated embodiments are attached as Appendix A.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer implemented method for monitoring one or more Mobility Management Entities (MMEs) with a plurality of clustered Virtual Machines (VMs), comprising:
    receiving ciphered packets in a packet switching device from one or more MMEs;
    sending each of the received ciphered packets from the packet switching device to each of the plurality of clustered VMs;
    receiving, in each of the plurality of clustered VMs, the ciphered packets sent from the packet switching device;
    deciphering, in each of the plurality of clustered VMs, the received ciphered packets;
    extracting metadata from the deciphered packets in each of the plurality of clustered VMs;
    retaining deciphered packet information, based upon analysis of extracted metadata, at each individual respective VM of the plurality of clustered VMs wherein the retained packet information is associated with an individual subscriber assigned to a respective VM retaining the packet information; and
    discarding deciphered packet information at each individual respective VM of the plurality of clustered VMs wherein the discarded packet information is associated with one or more subscribers not assigned to a respective VM discarding the packet information.

2. The method as recited in claim 1, further including the steps:
    generating KPI data, in each of the plurality of VMs, associated with an individual subscriber assigned to a respective VM; and aggregating subscriber related data from the plurality of clustered VMs in at least one monitoring device operably coupled to the plurality of clustered VMs wherein a user of the at least one monitoring device is provided with the perception that the monitoring device is coupled to a single VM.

3. The method as recited in claim 2, wherein each of the plurality of clustered VMs is configured to generate multiple synthetic packets from a received synthetic packet wherein each of the multiple synthetic packets is associated with an individual subscriber whereby each of the plurality of VMs retains packet information associated with a certain subscriber as prescribed by the monitoring device and discards the remaining synthetic packets associated with other subscribers.

4. The method as recited in claim 1, wherein the metadata consists of session information utilized by the plurality of VMs for parallel processing of packet sessions across multiple subscriber session threads.

5. The method as recited in claim 1, wherein the deciphering of packets in each of the plurality of VMs determines Temporary Identifiers (M-TMSI) assigned to an individual subscriber.

6. The method as recited in claim 1, further including detecting subscriber session transitions during MME handovers.

7. The method as recited in claim 1, further including detecting session transitions during inter-RAT handovers.

8. The method as recited in claim 1, wherein a plurality of monitoring devices are operably coupled to the plurality of clustered VMs.

9. The method as recited in claim 2, wherein the at least one monitor device is configured to perform on-demand analysis of subscriber packet information.

10. The method as recited in claim 9, wherein the at least one monitoring device includes aggregated subscriber information received from the plurality of clustered VMs such that subscriber data is aggregated from each of the plurality of clustered VMs.

11. The method as recited in claim 10, wherein the monitoring device is configured to aggregate Key Performance Indicator (KPI) data from each of the plurality of clustered VMs associated with one or more subscribers.

12. The method as recited in claim 1, wherein the at least one monitor device is configured to perform real-time analysis of subscriber packet information by querying and retrieving subscriber information from each of the plurality of clustered VMs relating to a user analysis request so as to retrieve subscriber data from an individual VM regarding a subscriber associated with the user analysis.

13. The method as recited in claim 1, wherein each VM is a network probe device.

14. The method as recited in claim 13, wherein each network probe device is an ISNG device configured to generate Adaptive Service Intelligence (ASI) data.

15. The method as recited in claim 1, wherein the MME includes at least one of S1-MME, S3, S10 and S6a feed interfaces.

16. A computer system for monitoring one or more Mobility Management Entities (MMEs), comprising:
  a packet switching device coupled to one or more MMEs configured for receiving ciphered packets from the one or more MMEs;
  a plurality of clustered VMs coupled to the packet switching device, each of the plurality of clustered VMs configure to:
    receive ciphered packets sent from the packet switching device;
    decipher the received ciphered packets;
    extract metadata from the deciphered packets;
    selectively retain deciphered packet information, based upon analysis of extracted metadata, wherein the retained packet information is associated with an individual subscriber assigned to a respective VM retaining the packet information; and
    discard deciphered packet information wherein the discarded packet information is associated with one or more subscribers not assigned to a respective VM discarding the packet information.

17. The computer system as recited in claim 16, wherein KPI data is generated in each of the plurality of VMs relating to an individual subscriber assigned to VM generating the KPI data.

18. The computer system as recited in claim 17, further including at least one monitoring device operably coupled to the plurality of clustered VMs configured to aggregate subscriber related data from the plurality of clustered VMs wherein a user of the at least one monitoring device is provided with the perception that the monitoring device is coupled to a single VM.

19. The computer system as recited in claim 18, wherein each of the plurality of clustered VMs is configured to generate multiple synthetic packets from a received synthetic packet wherein each of the multiple synthetic packets is associated with an individual subscriber whereby each of the plurality of VMs retains packet information associated with a certain subscriber as prescribed by the monitoring device and discards the remaining synthetic packets associated with other subscribers.

20. The computer system as recited in claim 18, wherein the at least one monitoring device includes aggregated subscriber information received from the plurality of clustered VMs such that subscriber data is aggregated from each of the plurality of clustered VMs.

* * * * *